(12) United States Patent
Taguchi et al.

(10) Patent No.: US 8,704,032 B2
(45) Date of Patent: Apr. 22, 2014

(54) ASBESTOS-TREATING AGENT AND METHOD FOR TREATING ASBESTOS

(75) Inventors: Yoshihiro Taguchi, Kanagawa (JP); Teruhiko Kusano, Tokyo (JP); Hiroaki Harano, Nagano (JP)

(73) Assignee: Santec Corporation, Tokyo (JP)

( * ) Notice: Subject to any disclaimer, the term of this patent is extended or adjusted under 35 U.S.C. 154(b) by 180 days.

(21) Appl. No.: 13/509,789

(22) PCT Filed: Nov. 19, 2010

(86) PCT No.: PCT/JP2010/071187
§ 371 (c)(1),
(2), (4) Date: May 14, 2012

(87) PCT Pub. No.: WO2011/062295
PCT Pub. Date: May 26, 2011

(65) Prior Publication Data
US 2012/0289756 A1    Nov. 15, 2012

(30) Foreign Application Priority Data

Nov. 19, 2009  (JP) ................................. 2009-264329
Oct. 18, 2010  (JP) ................................. 2010-233955

(51) Int. Cl.
*A62D 3/36*     (2007.01)
(52) U.S. Cl.
USPC ....................... 588/313; 588/411; 252/182.12

(58) Field of Classification Search
USPC ............. 588/318, 313, 411, 900; 252/182.12, 252/183.11
See application file for complete search history.

(56) References Cited

FOREIGN PATENT DOCUMENTS

| JP | H07-12986 A | 1/1995 |
|---|---|---|
| JP | 2007-295943 A | 11/2007 |
| JP | 2007-296416 A | 11/2007 |
| JP | 2008-253854 A | 10/2008 |

OTHER PUBLICATIONS

International Search Report for PCT/JP2010/071187, Jan. 11, 2011.

*Primary Examiner* — Edward Johnson
(74) *Attorney, Agent, or Firm* — Chernoff Vilhauer McClung & Stenzel LLP (57) ABSTRACT

To provide a treatment agent for asbestos, which has a less influence on human body, the construction and the surrounding environment and can render the asbestos harmless evenly up to the inside of the bulky covering materials, which cover the wall, or the slate materials, and a treatment method of the asbestos using the same.

A treatment agent for asbestos, which contains phosphoric acid of 0.5 through 3.0% by weight, hydrogen peroxide of 1 through 20% by weight, alcohol of 0.5 through 20% by weight and pure water and a treatment method of the asbestos using the same are described.

9 Claims, 11 Drawing Sheets

ASBESTOS-TREATING AGENT AND METHOD FOR TREATING ASBESTOS

This is a national stage application filed under 35 USC 371 based on International Application No. PCT/JP2010/071187 filed Nov. 19, 2010, and claims priority under 35 USC 119 of Japanese Patent Application No. 2009-264329 filed Nov. 19, 2009 and of Japanese Patent Application No. 2010-233955 filed Oct. 18, 2010.

TECHNICAL FIELD

The present invention relates to a treatment agent for asbestos, which is used for denaturing the asbestos and rendering it harmless, and a treatment method of rendering the asbestos harmless by using the same.

BACKGROUND ART

The asbestos has been widely used as, particularly, building materials and there have been, as its uses, covering materials for covering a wall, sound-absorbing materials, insulation materials, molded slate materials and the like. However, separated asbestos fibers become thin fibrous dust, which may cause lung cancer, pulmonary fibrosis and mesothelioma, and have a harmful effect on human body and his or her health, so that any uses of the asbestos have been prohibited or limited.

Since the asbestos, however, has been also contained in the building materials of constructions constructed before the prohibition of its uses, users using the constructions may suffer any harmful effects on their health. Further, since any dispersion of the asbestos fibers may occur when these constructions are deconstructed, any harmful effect by the asbestos on the health of the persons for deconstructing them may become serious and contamination of environment by the asbestos or the like may also become serious. Thus, any means for treatment of rendering the asbestos harmless is widely required.

In the treatment method of rendering the asbestos harmless, safety is required for any persons of treatment while they do the treatment of rendering the asbestos harmless. Further, since there are larger quantities of the asbestos used in the construction constructed before the prohibition of its use and/or used in any other uses, it is hopeful that any costs required for apparatus and chemicals used for treatment of rendering the asbestos harmless or required for the treatment thereof are minimum ones.

The patent document 1 discloses a technology such that by using a treatment agent for asbestos containing phosphoric acid aqueous solution of 0.5 through 50% by weight and by spraying or applying such a treatment agent for asbestos against any building materials containing the asbestos, which covers the walls, ceiling and the like of the construction, the asbestos in the building materials is denatured so that its fibrous ones become bulked ones.

The patent document 2 discloses a technology such that using a treatment agent for asbestos in which hydrogen peroxide is added into an aqueous solution containing phosphoric acid of 30 through 50% so that the hydrogen peroxide becomes 3 through 5% by weight, such a treatment agent for asbestos is sprayed or applied against any building materials containing the asbestos, or the building materials are inserted into such a treatment agent.

PRIOR ART DOCUMENTS

Patent Documents

[Patent Document 1]: Japanese Patent Publication No. H07-012986
[Patent Document 2]: Japanese Patent Application Publication No. 2007-295943

DISCLOSURE OF THE INVENTION

Problems to be Solved by the Invention

In the technology described in the Patent Document 1, however, a phenomenon may generate in which unevenness (lumps) of unreacted materials remain in the building materials when treating the building materials using the treatment agent for asbestos. Further, reacted gas may occur accompanying problems of the stench or damage to the health when spraying or applying the treatment agent for asbestos against any building materials. It is believed that these problems occur because the treatment agent for asbestos is hard to be evenly spread into the building materials so that there becomes unevenness in the concentration of phosphoric acid spread into the building materials and an excessive reaction occurs in the high concentration portions.

In order to prevent this, when using the treatment agent for asbestos, which is described in the patent document 1, the unevenness of unreacted materials is required to decrease by increasing the concentration of the phosphoric acid and increasing the concentration of the phosphoric acid in whole of the construction when the treatment is performed to force the phosphoric acid to react. According to examination by the inventors, however, if the concentration of the phosphoric acid is increased, the treatment agent for asbestos cannot keep its safety. For example, when setting the concentration of the phosphoric acid to be 4.0% by weight, a person may get burnt or the like on his or her skin when it comes into contact with a human body. Accordingly, in the operations to spray or apply it against the building materials or the operations to insert the building materials into the treatment agent, any problems for safety of the operator(s) generate. Further, it is difficult to remove the highly concentrated phosphoric acid, which is contained in the treatment agent for asbestos, by washing by water or the like after the asbestos has been rendered harmless so that any dangers by the acid may remain to the operators of the following operations or a user of the construction.

Further, when the highly concentrated phosphoric acid, which is contained in the treatment agent for asbestos, remains in the construction, any corrosion by the acid may occur in a reinforcing rod thereof or the like. Although it is conceivable that such phosphoric acid is rendered harmless by neutralizing it using alkaline chemicals after the operations, a large amount of chemicals is required since the concentration of the phosphoric acid is increased, which causes a new problem such as a damage of the safety of the operations by alkaline of the chemicals themselves and costs to the chemicals and operations.

Further, when increasing the concentration of the phosphoric acid to be contained in the treatment agent, it is impossible to suppress any occurrence of reacted gas due to the excessive reaction when the treatment is performed. When inserting materials of the construction containing various kinds of inorganic elements or inorganic compounds into any strong acid, various kinds of gases may generate so that the gases may exert a very harmful influence upon a human body, a construction or a surrounding environment. It is strongly feared that particularly, any fluoride which exerts a harmful influence upon the human body and accelerates corrosion or the like, particularly, hydrogen fluoride generates. It may be difficult to operate the treatment for asbestos if other gas, which does not directly exert a harmful influence upon a human body but has a nasty smell or an irritating smell, generates.

On the other hand, in the technology described in the Patent Document 2, by adding the hydrogen peroxide to the treatment agent for asbestos, an amount of the resolved asbestos is increased, which suppresses unevenness of unreacted materials and any occurrence of reacted gas. Hydrogen peroxide, however, is hard to stay in the aqueous solution stably so that it is lost rapidly from the treatment agent for asbestos. This may cause unevenness of unreacted materials and reacted gas to generate if it takes a long time to perform the treatment.

This treatment agent for asbestos contains high concentration of phosphoric acid, 30% through 50%, so that the treatment is performed on the basis of a severe reaction of a short time. It takes a long time until the treatment agent for asbestos has been gotten into the building materials when the treatment agent for asbestos is added to the building materials such as covering materials, slate materials or the like having a thickness of 1 through 3 cm or more so that hydrogen peroxide is lost up to that time, which cannot solve the problem on the unevenness of unreacted materials and any occurrence of reacted gas. Further, because the treatment agent containing high concentration of phosphoric acid is used, a problem of safety has not yet solved.

This invention is invented in consideration of the above-mentioned points, and has an object to provide a treatment agent for asbestos, which has a less influence on human body, the construction and the surrounding environment and can render the asbestos harmless by permeating it evenly into the inside of the materials to be treated such as the bulky covering materials, which cover the wall, and the slate materials, and a treatment method for the asbestos using the same.

Means for Solving the Problems

A treatment agent for asbestos according to the invention contains phosphoric acid of 0.5 through 3.0% by weight, hydrogen peroxide of 1 through 20% by weight, alcohol of 0.5 through 20% by weight, and the remaining pure water.

By the phosphoric acid of 0.5 through 3.0% by weight, the asbestos is treated to render it harmless; By the hydrogen peroxide of 1 through 20% by weight, unevenness does not occur in the reaction of the asbestos by the phosphoric acid; and by the alcohol of 0.5 through 20% by weight, the hydrogen peroxide in a treatment solution is kept stable for a long time. Since the remaining is pure water, it avoids reacting any impurities in the water and the phosphoric acid or the like to deteriorate a capacity of the treatment of the asbestos. Based on these functions, the treatment agent for asbestos performs the treatment of the asbestos evenly for a long time so that it is not necessary that the phosphoric acid of high concentration forces the unreacted materials to be reacted or it reacts the unreacted materials for a short time, and the phosphoric acid of low concentration such as 0.5 through 3.0% by weight is contained. Since the phosphoric acid has low concentration, the safety to the human body is high. By these operations, the treatment agent for asbestos is obtained whereby the materials to be treated such as the bulky slate materials and the bulky cover materials for the wall are treated and the safety is superior.

It is preferable that the pure water has electric conductivity of 2.0 mS/m or less. Since the pure water contains less impurity, the treatment capacity of the treatment agent for asbestos is maintained.

It is preferable that the phosphoric acid of 1.0 through 2.5% by weight is contained; the hydrogen peroxide of 2.0 through 6.0% by weight is contained; and the alcohol includes ethanol of 1.0 through 5.0% by weight.

The ethanol having a concentration of 1.0 through 5.0% by weight has a high safety, is suitable for operations, and is cheap, which is a concentration that is sufficient for stabilizing the hydrogen peroxide and enhancing the permeability of the treatment agent for asbestos. Further, since the phosphoric acid having a concentration of 1.0 through 2.5% by weight is contained, the reactivity and safety of the phosphoric acid are compatible with each other even if quality of the solution varies or a concentration varies based on evaporation of a part of the solution, and the hydrogen peroxide having a concentration of 2.0 through 6.0% by weight, which is a concentration that is sufficient for preventing unevenness in the reaction of the phosphoric acid and is not too a high concentration, allows a safety to be maintained from the corrosion by the hydrogen peroxide.

A treatment method of asbestos according to this invention comprises the steps of permeating a treatment agent for asbestos into materials to be treated, which contain the asbestos, the agent containing phosphoric acid of 0.5 through 3.0% by weight, hydrogen peroxide of 1 through 20% by weight, alcohol of 0.5 through 20% by weight, and pure water, and then washing the treatment agent for asbestos by washing water and removing it from the materials to be treated.

Thus, by the phosphoric acid of a concentration which is the concentration that is high safety in human body, the asbestos are treated so as to be rendered harmless, and at this moment, the hydrogen peroxide do not cause unevenness in the reaction of the asbestos and by the alcohol, the hydrogen peroxide in the treatment solution is kept stable for a long time, so that the permeability to the materials such as the slate or wall largely using the asbestos is enhanced. Thereafter, since the phosphoric acid remained in the materials to be treated is washed and removed, safety is maintained when the materials to be treated is then treated or recycled.

It is preferable that the phosphoric acid of 1.0 through 2.5% by weight is contained, the hydrogen peroxide of 2.0 through 6.0% by weight is contained, and the alcohol includes ethanol of 1.0 through 5.0% by weight. It is preferable that the pure water has electric conductivity of 2.0 mS/m or less.

It is preferable that the washing water has pH of 7.0 or more.

By using alkaline washing water, any acidic components contained in the treatment agent for asbestos, particularly, the phosphoric acid is neutralized and effectively washed.

It is preferable that the materials to be treated are building materials which contain the asbestos, the treatment agent for asbestos is permeated into the building materials by spraying it to the building materials, and then the treatment agent for asbestos is washed and removed by spraying the phosphoric-acid-washing water to the building materials.

Thus, by spraying the treatment agent for asbestos to the building materials of the construction, the asbestos contained in the building materials is rendered harmless. By spraying the phosphoric-acid-washing water, the treatment agent for asbestos remained in the building materials is washed out, particularly, the phosphoric acid is washed out. This enables the asbestos to be rendered harmless and the acidic components to be removed.

It is preferable that the materials to be treated are building materials which contain the asbestos, the treatment agent for asbestos is permeated into the building materials by inserting the building materials into the treatment agent for asbestos, and then the treatment agent for asbestos is washed and removed by inserting the building materials into the phosphoric-acid-washing water.

Thus, by inserting the building materials into the treatment agent for asbestos, the asbestos contained in the building materials is rendered harmless. This treatment agent for asbestos contains the phosphoric acid, the hydrogen peroxide and the alcohol so that it enables the asbestos in the building materials to be evenly rendered harmless and its operation is maintained for a long time, thereby enabling any building materials of large sizes to be rendered harmless by insertion thereof for a long time. By inserting it into the phosphoric-acid-washing water, the treatment agent for asbestos remained in the building materials is seeped and washed out, particularly, the phosphoric acid is washed.

Effect of the Invention

According to this invention, it is possible to render the asbestos harmless evenly without having the harmful influence such as a burn on the human body by the phosphoric acid of 0.5 through 3.0% by weight, the hydrogen peroxide of 1 through 20% by weight and the alcohol of 0.5 through 20% by weight and to maintain the operation of the treatment of rendering it harmless for a long time. Since the remaining is pure water, it avoids reacting any impurities in the water and the phosphoric acid or the like to deteriorate a capacity of the treatment of the asbestos. Therefore, the materials to be treated such as the building materials can be effectively treated and the safety is high.

Further, since the phosphoric acid has a low concentration, a large amount of chemicals such as alkaline ones for a removing step of the acidic components is not required. Additionally, since the chemicals have low concentration, costs of the treatment agent for asbestos itself are reduced and since the safety is highly kept, working costs of the treatment to render it harmless are also reduced so as to be low.

BEST MODE FOR CARRYING OUT THE INVENTION

A description will be given of embodiments of a treatment agent for asbestos according to the present invention.

First Embodiment

The treatment agent for asbestos according to the first embodiment contains phosphoric acid of 0.5 through 3.0% by weight, hydrogen peroxide of 1 through 20% by weight, alcohol of 0.5 through 20% by weight and pure water.

Here, the phosphoric acid widely includes the so-called phosphoric acids or the like having a phosphoric acid radical, which is ionized in the water as a form of a phosphoric acid ion, in addition to any compounds representing $H_3PO_4$. Such a phosphoric acid includes orthophosphoric acid, metaphosphoric acid, pyrophosphoric acid, polyphosphoric acid or metal acidic phosphate which generates the identical ions.

When the concentration of the phosphoric acid is fallen below 0.5% by weight, the reaction against the asbestos is insufficient. When it exceeds 3.0% by weight, the safety of the phosphoric acid to the human body is insufficient. In this treatment agent for asbestos, if the concentration of the phosphoric acid exceeds 3.0% by weight, the inventors have found out that a phenomenon like a burn, bleaching and an acute pain suffer for a skin.

It is particularly preferable that the concentration of the phosphoric acid is 1.0% by weight or more in order to maintain reliability of the reaction, taking into account a variation in the concentration which can occur based on an error, temperature, reaction after the adjustment and the like. Further, it is particularly preferable that the concentration of the phosphoric acid is adjusted so to be fallen below 2.5% by weight because there is hardly any influence to a skin even if the agent contacts the skin up to some minutes by the dispersion or the like.

In the first embodiment, the concentration of the phosphoric acid is set so as to be 2.0% by weight or more because the reaction of the phosphoric acid is secured even in any spraying operations in order to use the treatment agent for asbestos for the spraying operations to the building materials of the construction or the like, and it is set so as to be 2.5% by weight or less because the safety is secured, taking into consideration a possibility of the dispersion to the human body by the spraying operations.

The hydrogen peroxide is a compound representing $H_2O_2$. When the concentration of the hydrogen peroxide is fallen below 1% by weight, an effect for preventing unevenness in the reaction of the phosphoric acid from occurring is not sufficiently obtained. When the concentration of the hydrogen peroxide is increased, the effect for preventing unevenness in the reaction of the phosphoric acid is enhanced, so that because the concentration of the hydrogen peroxide is not rapidly lost by operation of the alcohol in this treatment agent for asbestos, the concentration thereof may be increased up to about 20% by weight. If it exceeds 20% by weight, it may be difficult to adjust the concentrations of other components. The hydrogen peroxide is slowly lost from the water but it is particularly preferable that the concentration thereof is set to be 2% by weight or more to secure the reaction even if it is lost to some extent. Further, since the hydrogen peroxide may have any harmful influence upon the surrounding environment by its corrosion, it is particularly preferable that the concentration thereof is set to be 6% by weight or less in order to reduce such an influence. It is to be noted that the hydrogen peroxide of 6 through 20% by weight may be used in a case where a problem of any harmful influence upon the surrounding environment is limited on the treatment within a relatively narrow region or it takes a long time especially to perform the treatment.

In this first embodiment, the concentration of the hydrogen peroxide water is set so as to be 3.5 through 4.5% by weight. Setting it so as to be 3.5 by weight or more is because in relation to the phosphoric acid, the high reaction thereof is secured to some extent in order to use the agent for the spraying or this is a low limit wherein the reaction is not lost even if the hydrogen peroxide is gradually lost for a long time up to the permeation thereof through the building materials. Setting it so as to be 4.5% by weight or less is because a large amount of the treatment agent is used for the spraying and it takes into consideration a balance between the costs therefor and the amount thereof.

The alcohol is a chemical having OH radical(s). Any species of the alcohol may be used but it is preferable that the lower alcohol is used because of a high affinity for the water, because it is easy to maintain its purity, because it is easy to be available and/or because of its cost. The purity thereof is little important but it is desirable that the alcohol having the purity of 90% or more is used because it is undesirable that the impurities contained therein react on the phosphoric acid. The ethanol is preferable among species of the alcohol which secures these natures because it is easy to be particularly available and because of the safety.

The concentration of the alcohol is required to be 0.5 through 20% by weight. When the concentration of the alcohol is fallen below 0.5% by weight, an effect for preventing the hydrogen peroxide from being lost is not obtained. It is required to be 20% by weight or less as an aim because, when the concentration of the alcohol is too high, impurities in the water may be deposited or it may be difficult to adjust the concentration of other components.

In a case of the ethanol, it is desirable that the ethanol is 1.0 through 5.0% by weight because of its reactivity. Here, the ethanol of 2.0 through 3.0% by weight is used to prevent the hydrogen peroxide from being lost until the treatment agent for asbestos is sprayed to and gotten into the building materials.

The pure water to be used in the treatment agent for asbestos occupies about 67 through 98% by weight, which is other component or the remaining one therein. The pure water, ionic strength of which is weak, is required because impurities therein do not react on other components. Deionized water, RO water, distilled water, purified water or the like is desirable.

As an aim of the purity of pure water, when the electric conductivity (mS/m) is smaller (or the more the resistivity ($\Omega \cdot cm$) is larger), water has a higher purity. The pure water used in this embodiment has electric conductivity of 2.0 mS/m or less, preferably, 1.0 mS/m or less, which is generally called as the pure water in the art of industrial articles or food products.

The following will describe operations of the treatment agent for asbestos according to the first embodiment.

When the treatment agent for asbestos contacts the materials to be treated, it gets into the materials to be treated. In this moment, the hydrogen peroxide and/or the alcohol enable(s) the treatment agent for asbestos to be easy to get into the materials to be treated or to be easy to permeate evenly thereinto. Although it may take 15 minutes through one hour to get the treatment agent for asbestos into the building materials, which have a thickness of some centimeters, the alcohol prevents unstable hydrogen peroxide from being lost from the solution. Accordingly, even if the concentration of phosphoric acid is low up to the lowest limit that is required to react in order to render the asbestos harmless, it is sufficiently possible to render the asbestos harmless because the operation of the treatment agent lasts for a long time.

When the treatment agent for asbestos gets into the materials to be treated and contacts the asbestos contained in the materials to be treated, it denatures the asbestos fibers and changes them to crystallized ones to render them harmful. A principle thereof is believed such that the phosphoric acid reacts on metal ionized portion(s) contained in the asbestos, which forms phosphate with any components of the asbestos, thereby enabling the asbestos to be denatured or rendered harmless.

The inventors have found out that by containing the phosphoric acid of 0.5 through 3.0% by weight, the hydrogen peroxide of 1 through 20% by weight and the alcohol of 0.5 through 20% by weight together, it is possible to possess the operation of the treatment to render the asbestos harmless by the phosphoric acid, the even permeability to the materials to be treated by the hydrogen peroxide and the maintenance of the hydrogen peroxide by the alcohol when permeating the agent into the materials to be treated, all together. Although a detail of a mechanism such that the hydrogen peroxide prevents the reaction by the phosphoric acid or the alcohol maintains the hydrogen peroxide is not understood, it has been experimentally found by the trials of rendering the asbestos harmless that based on the proportion of each of the components, operation of each of the components can be preferably possessed together. These concentrations enable to be obtained the treatment agent for asbestos, which contains each component having a concentration which is not harmful to the human body.

The treatment agent for asbestos according to this embodiment keeps a capacity of the treatment for asbestos, by using pure water as water, for at least 10 days through one month even after the phosphoric acid, the hydrogen peroxide and the alcohol have been mixed. The inventors have checked that when tap water is used as water, the solution of the treatment agent for asbestos becomes cloudy as soon as it rests on so that its capacity of the treatment for asbestos deteriorates. Although a detail of such a phenomenon is not understood, it is expected that the phenomenon occurs by permitting any impurities, contained in the tap water, such as calcium, which are metal ions in the main, to react with the phosphoric acid or the like. When using the pure water, such a reaction to become cloudy does not occur, thereby enabling long term storage thereof after the adjustment thereof.

The following will describe a treatment method of asbestos using the treatment agent for asbestos according to the first embodiment. Here, a case will describe in which by spraying the treatment agent for asbestos against the building materials containing the asbestos, the treatment to render the asbestos harmless is performed.

In this method, the treatment agent for asbestos containing the phosphoric acid of 0.5 through 3.0% by weight, the hydrogen peroxide of 1 through 20% by weight, the alcohol of 0.5 through 20% by weight and the pure water is used.

In the first embodiment, the phosphoric acid of 2.0 through 2.5% by weight, the hydrogen peroxide of 3.0 through 4.0% by weight, the ethanol of 2.0 through 3.0% by weight and the remaining pure water are mixed together to prepare the treatment agent for asbestos. Although the pure water to be mixed, pH of which is adjusted, may be used, the pure water with pH of 7 or less is used. This is because it is desirable that the pure water is not alkaline as the phosphoric acid is neutralized if the pure water is alkaline, which causes to be deteriorated an action of the treatment to render the asbestos harmless. Any aqueous solution with weak acidity having pH of 6.0 or less may be used, and more surely, any aqueous solution having pH of 4.0 or less may be used.

This treatment agent for asbestos is sprayed to the materials to be treated containing the asbestos. The materials to be treated are generally referred to be as the materials containing the asbestos, for example, the building materials or parts of the vehicle, mainly, seal materials. Here, the materials to be treated are the building materials which are materials used for walls and roof of a construction, such as mortar, plaster or concrete and include plaster board, smoothly planed board, synthetic slate, cover materials for fireproof and insulation, and the like. The materials to be treated also are terms indicating the materials using in the construction, the building materials separated or removed, unused surplus building materials and the like. In the first embodiment, the building materials as the materials to be treated are cover materials containing the asbestos, which are used in the construction and cover the walls in the construction.

The asbestos includes chrysotile asbestos, which are widely used, amosite asbestos, crocidolite asbestos, anthophylite asbestos, tremolite asbestos, actinolite asbestos and the like.

When spraying the treatment agent for asbestos to the building materials, an implementation thereof is specifically carried out by using an atomization or an application so that the treatment agent for asbestos is almost evenly dispersed into the whole of the construction. Here, the atomization is carried out by using a compressor and an atomizing nozzle. The atomization enables a large area to be easily executed. It is to be noted that by using a brush or the like, the application to a narrow area can be carried out. In a latter case, the concentration of the phosphoric acid may be increased up to the maximum concentration of 3.0% by weight, which enhances the reactivity thereof, because there is a low risk of dispersing the treatment agent for asbestos to the operator(s). An amount thereof to be sprayed is required so as to be able to get into the whole of the thickness of the building materials, for example, it is means that an amount thereof so that the building materials may be seen to be wet is sprayed. However, it is sufficient that an amount thereof is sprayed which is an amount identical to a volume of the building materials in the materials to be treated or more as an aim. The treatment agent according to this embodiment has a high security and is easy to be washed and removed so that the treatment agent of a rather lager amount thereof, for example, the treatment agent of twofold through threefold amounts of the building materials may be sprayed.

Next, it leaves an interval for allowing the treatment agent for asbestos to get into the building materials, which are materials to be treated, to come into contact with the asbestos contained in the building materials and to react with it. When the building materials containing the asbestos have a thickness of 2 through 3 cm, it takes about 5 through 30 minutes but when the building materials have a thickness of 3 through 5 cm, it may take 30 through 90 minutes until the treatment agent has gotten thereinto.

Thereafter, the materials to be treated which are rendered harmless by the treatment agent for asbestos are washed by phosphoric-acid-washing water. Although the treatment agent for asbestos according to this embodiment is little dangerous even if it remains in the construction or the like as it is, this washing is performed because it is convenient when the treated materials are recycled and it is further hoped that the treatment agent for asbestos is washed and acidic components are removed, without exerting any influence to the surrounding environment. The phosphoric-acid-washing water is water, an aqueous solution in which pH control chemicals or the like are added to the water, or the like. Regarding the water used for the phosphoric-acid-washing water, the purity is no matter how extent it is, for example, the pure water used when preparing the treatment agent for asbestos may be used, the tap water or water for industrial use, which has less purity and low costs, may be used. It is desirable that its pH exceeds 7.0 because it is desirable that the phosphoric-acid-washing water washes the treatment agent for asbestos and neutralizes the acidic components. Since the treatment agent for asbestos according to this embodiment contains no high concentrated acidic component, any high concentrated counteragents are not required and inversely, it is not desirable for the safety to use the counteragents because if they are used, any alkaline components remain behind. Accordingly, it is desirable that the phosphoric-acid-washing water has pH of approximately 8 and 9, which is weak alkaline one.

Such handling enables the asbestos to be rendered harmless in the building material, which is the materials to be treated, and then enables the treatment agent for asbestos to be washed out. The wall covered by the building materials can be securely used as it is or with it being re-coated. Further, it is possible to carry out the treatment thereafter such as pulling the construction down in safety.

Second Embodiment

In the second embodiment, the materials to be treated are any building materials containing the asbestos and by inserting the building materials into the treatment agent for asbestos, the treatment agent for asbestos contacts the asbestos and then, by inserting the building materials into the phosphoric-acid-washing water, the treatment agent for asbestos is washed out and removed. It is to be noted that a description of components thereof like those of a case of the first embodiment will be omitted.

Here, the building materials are a slate made of concrete or mortar. Such a slate contains asbestos as a main object of reinforcing a structure. Further, it is desirable that a thickness thereof is 5 cm or less at most in order to be able to permeate the treatment agent for asbestos into the building materials by inserting them thereinto. It is also desirable that a thickness thereof is 3 cm or less at most in order to secure a speedy reaction for a period of time less than 15 through 30 minutes and the reliable and uniform treatment to render the asbestos harmless based on the reaction. It is reasonably available for a slate with a fixed scale (the thickness thereof is about 0.8 through 1.0 cm and the area thereof is about 90 cm×180 cm).

The treatment agent for asbestos according to the second embodiment contains phosphoric acid of 2.5 through 3.0% by weight, hydrogen peroxide of 4.0 through 6.0% by weight, alcohol of 2.0 through 3.0% by weight and pure water.

Since the building materials are inserted into the treatment agent for asbestos in this embodiment, there is a less possibility that an operator is put in danger than that of a case of dispersing it to him, for example, spraying it to him. Accordingly, a high concentration of the phosphoric acid, hydrogen peroxide water and the alcohol is selected within a range unless their safeties are lost, so that their reactivities are enhanced. If a volume for the insertion is little, the operation is a small scale and there is no possibility of any dispersion, the concentration of the hydrogen peroxide water and the alcohol may be respectively increased up to about 6.0 through 10% by weight and about 3.0 through 6.0% by weight.

First, the treatment agent for asbestos having such a composition is prepared and then, the building materials to be treated are inserted into this treatment agent for asbestos. Since an amount of the treatment agent for asbestos in relation to the building materials may be sufficient for the insertion, it is identical to a volume of the building materials or more. As an aim, the amount thereof may be twofold through fivefold or more as large as the volume of the building materials. As a method of inserting them, regarding large scaled building materials such as a slate having fixed scale, for example, a method of putting the building materials into a container such as a tank and injecting the treatment agent for asbestos thereinto may be used. On the other hand, means for inserting the building materials by throwing them into the tank or the like in which the treatment agent for asbestos is filled or means for inserting the building materials with them being held by means of a wire, a net or the like may be used. In a case of small scaled building materials, which are ready to be handled, they are effective means because the treatment agent can contact the whole of the building materials at the same time.

Maintaining this inserted state causes the treatment agent for asbestos to be gotten into the materials to be treated, which forces it to react the asbestos contained in the materials to be treated. It takes about 5 through 15 minutes to get the treatment agent thereinto if the building materials containing the asbestos have a thickness of about 0.8 through 3 cm but it may take about 15 through 60 minutes until the treatment agent for asbestos is gotten thereinto if they have a thickness of about 3 through 5 cm.

The building materials which are the materials to be treated are then inserted into phosphoric-acid-washing water. An amount of the phosphoric-acid-washing water in relation to the building materials such that they may be inserted thereinto is sufficient. More amounts thereof, however, are desirable because the wash is performed. As an aim, the amount thereof may be about threefold through tenfold as large as the volume of the building materials. It is to be desired that an interval is left until the phosphoric-acid-washing water is gotten into the building materials and washes them but the wash is sufficiently performed at the left interval of about 120 through 180 minutes. Further, the wash may be performed using water in order to remove the phosphoric-acid-washing water.

By this embodiment, the asbestos in the building materials is rendered harmless and acidic components are removed, which enables the building materials to be securely treated and recycled. For example, the building materials may be recycled by, for example, drying them and breaking them into fragments thereafter. Since the treatment agent for asbestos is washed out and removed, any apparatus for breaking them into fragments is not damaged by rust by acid.

EXECUTED EXAMPLES

Examined Example 1

The treatment agent for asbestos was prepared in which phosphoric acid of 2.0% by weight made by thinning commercial phosphoric acid solution (75 through 80% by weight), hydrogen peroxide of 4.0% by weight made by thinning commercial hydrogen peroxide solution, namely, hydrogen peroxide water of 30% by weight, ethanol of 1% by weight and pure water of 93% by weight were mixed. The slate made of cement (with a fixed scale of 1 cm×90 cm×180 cm) as the building materials to be treated was inserted into this treatment agent for asbestos for 20 minutes. This slate was then inserted into the water for 30 minutes and dried, which was an executed example 1.

As specimens, which are broken into fragments in a mortar, of this executed example 1 and a comparison example 1 of the same slate in which no treatment to render the asbestos harmless is performed, a qualitative analysis (JIS A 1481:2008) by X-ray diffraction (XRD) was performed.

In the executed example 1, as a result of XRD, quartz was detected in the specimen thereof but any peaks of chrysotile, amosite, crocidolite, anthophylite, tremolite and actinolite, which were known as the asbestos, were not detected. On the other hand, in the comparison example 1, brownmillerite in which there is a possibility of containing the chrysotile was detected so that a possibility of containing the chrysotile therein was seen.

Further, morphological observation was performed on the executed example 1 and the comparison example 1, respectively, by a scanning electron microscope (SEM). As the measuring apparatus, JSM-5610LV made by Japan Electron K.K. is used in which gold spattering is carried out.

Figure 1:
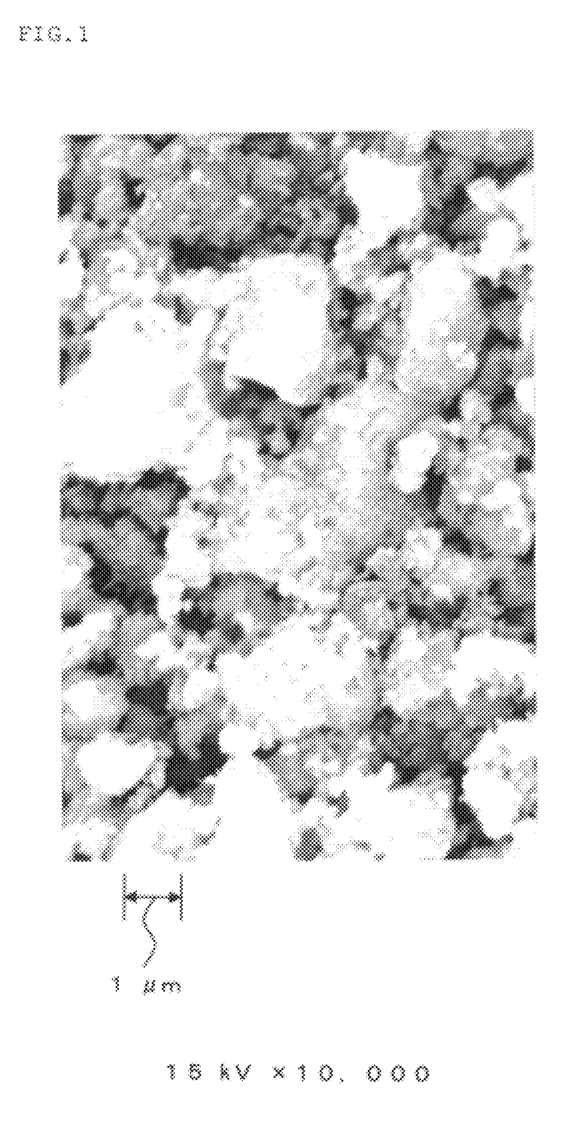
FIG. 1 is an electron microscope photograph of building materials of a first embodiment after the asbestos have been treated so as to be rendered harmless.
Figure 2A:
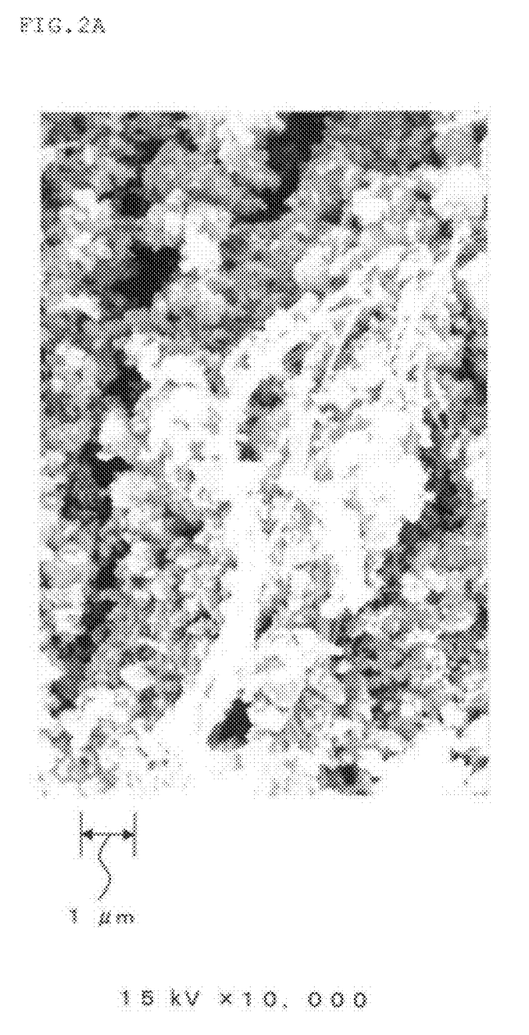
FIG. 2A is an electron microscope photograph of building materials of a comparison example 1 before the asbestos are treated so as to be rendered harmless.
Figure 2B:
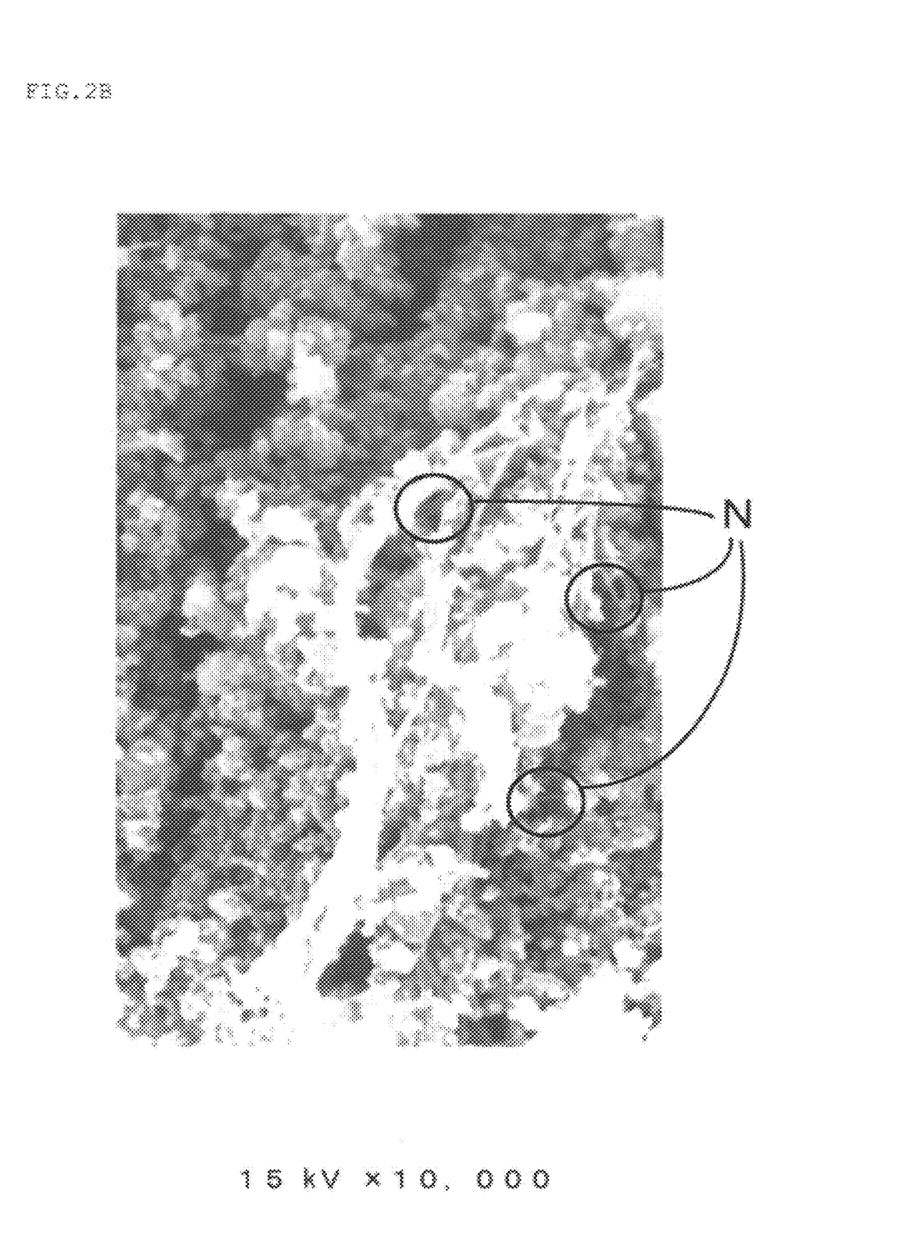
FIG. 2B is a diagram in which marks N are affixed to thin fiber like crystal materials, which are proper to the asbestos, shown in the photograph of FIG. 2A.

SEM photographs thereof of ten thousand magnifications are shown in FIG. 1 (as the executed example 1) and FIG. 2A (as the comparison example 1). There appear many pulverized materials in the specimen of the executed example 1 but there appear no needle-like crystalline material, which is proper to the asbestos, in the same. On the other hand, in the comparison example 1, there appear few needle-like crystalline materials, which are indicated by marks N in FIG. 2B and proper to the asbestos, in the specimen of the comparison example 1.

As a result of the above-mentioned measurement, it is determined that no asbestos is contained in the specimen of the executed example 1. On the other hand, in the comparison example 1, it is determined that there is a possibility of containing the chrysotile, which is a kind of the asbestos, in the comparison example 1.

Examined Example 2

Samples of the treatment agent were prepared in which various kinds of concentrations of phosphoric acid, hydrogen peroxide of 4% by weight, ethanol of 1% by weight and pure water were mixed. For the respective samples, the reactivities to the asbestos and influence on skin are shown in Table 1.

TABLE 1

| Concentrations of Phosphoric Acid (% by weight) | Reactivities to Asbestos | Influence on Skin |
| --- | --- | --- |
| 0.5 | Δ | ○ |
| 1.0 | ○ | ○ |
| 1.5 | ○ | ○ |
| 2.0 | ◎ | ○ |
| 2.5 | ◎ | ○ |
| 3.0 | ◎ | Δ |
| 3.5 | ◎ | X |

(Reactivities to the Asbestos in Table 1)

The symbol, indicates that any rapid change in a color of the slate and/or a quality of a surface thereof can be seen at almost the same time of the insertion thereinto. Through the electron microscope, no asbestos crystal can be checked.

The symbol, ○ indicates that any change in a color of the slate and/or a quality of a surface thereof can be seen up to some minutes after the insertion thereinto. Through the electron microscope, no asbestos crystal can be checked.

The symbol, Δ indicates that there is little change in a color of the slate and/or a quality of a surface thereof. Through the electron microscope, asbestos crystal remained in the slate can be checked.

(Influence on Skin in Table 1)

The symbol, ○ indicates no influence.

The symbol, Δ indicates that adhesion to a hand allows a person to feel a pain but by washing with water, it has gone.

The symbol, x indicates that the skin is burnt and whitens and a severe pain is suffered.

As seen from the Table 1, within a range wherein the concentration of phosphoric acid (% by weight) is 0.5 or less, reactivity to the asbestos is low, which is of no practical. When it is over 3.0, the influence on the skin is too severe, which is not suitable. The concentration of phosphoric acid (% by weight) is preferably suitable within a range of 1.0 through 2.5% by weight based on both of the reactivity to the asbestos and the influence on the skin. The concentration of about 2.0 through 2.5% by weight is optimal.

Examined Example 3

Figure 3A:
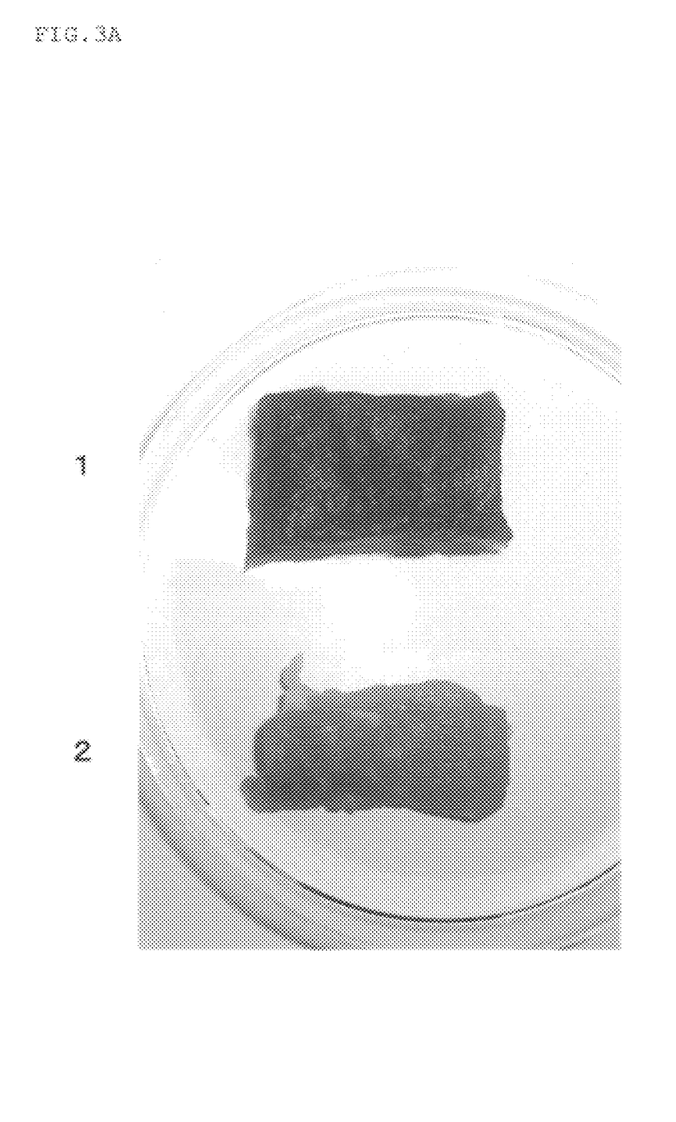
FIG. 3A is a photograph of fish meat and pork showing the influence on them by a concentration of the phosphoric acid contained in the treatment agent for asbestos.
Figure 3B:
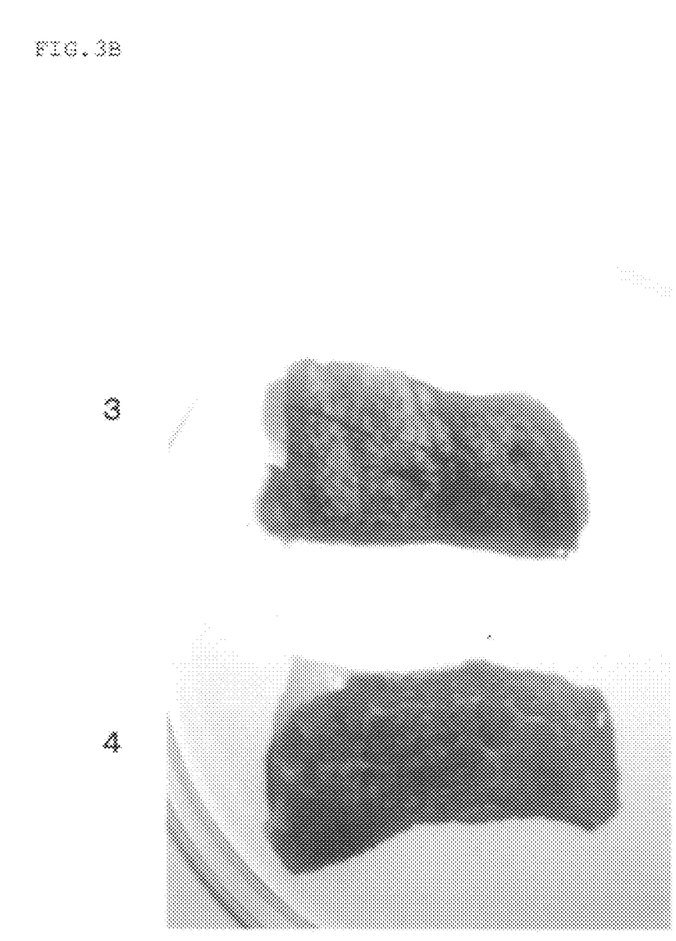
FIG. 3B is a photograph of fish meat and pork showing the influence on them by a concentration of the phosphoric acid contained in the treatment agent for asbestos.
Figure 3C:
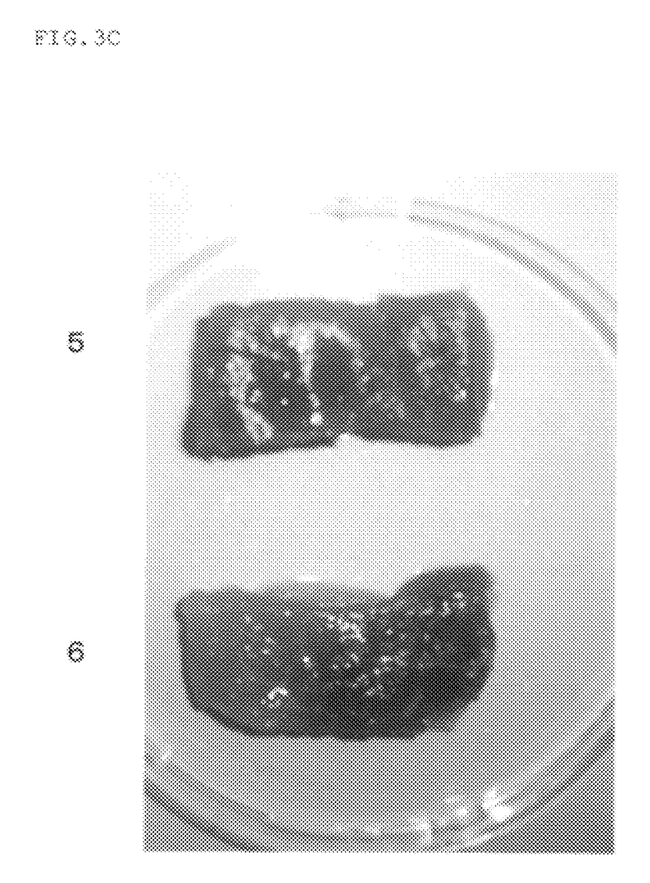
FIG. 3C is a photograph of fish meat and pork showing the influence on them by a concentration of the phosphoric acid contained in the treatment agent for asbestos.
Figure 3D:
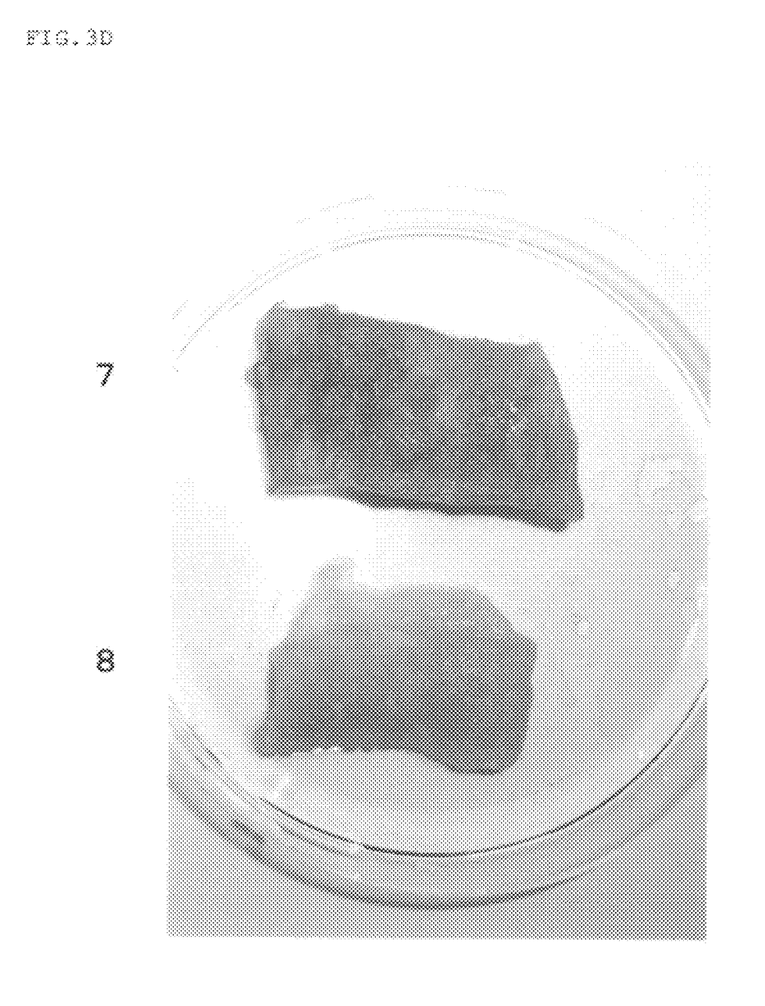
FIG. 3D is a photograph of fish meat and pork showing the influence on them by a concentration of the phosphoric acid contained in the treatment agent for asbestos.

In order to check any influence on human body by the concentration of phosphoric acid in the treatment agent for asbestos, any deterioration of tissue in akami of tuna and pork instead of human anatomy such as the skin was checked by inserting them into the treatment agents containing various kinds of the concentrations of phosphoric acid because they have biological tissue (protein) similar to that of the human anatomy. The treatment agent solutions were prepared in which phosphoric acids of 2, 30 and 50% by weight were respectively added to hydrogen peroxide of 4% by weight and ethanol of 1% by weight and the remaining was industrial water. Results when inserting the akami of tuna and pork in these treatment agents for three minutes are shown in Table 2 and FIGS. 3A through 3D. Figures shown in Table 2 and FIGS. 3A through 3D indicate such a change that 1 and 2 are respectively the akami of tuna and the pork before the insertion in FIG. 3A; 3 and 4 are respectively the akami of tuna and the pork inserted into the treatment agents in which the phosphoric acids of 2% is contained, in FIG. 3B; 5 and 6 are respectively the akami of tuna and the pork inserted into the treatment agents in which the phosphoric acids of 30% is contained, in FIG. 3C; and 7 and 8 are respectively the akami of tuna and the pork inserted into the treatment agents in which the phosphoric acids of 50% is contained, in FIG. 3D.

TABLE 2

| Concentrations of Phosphoric Acid (% by Weight) | Lean Tuna | Influence of Treatment Agent | Pork | Influence of Treatment Agent |
|---|---|---|---|---|
| (Before Insertion) | 1 | ○ | 2 | ○ |
| 2.0 | 3 | ○ | 4 | ○ |
| 30.0 | 5 | X | 6 | X |
| 50.0 | 7 | X | 8 | X |

(Influence by Treatment Agents on Akami of Tuna and Pork)

The symbol, ○ indicates no change.

The symbol, x indicates that it can be seen that the whole surface thereof whitens and deterioration occurs in the protein.

It is believed that the treatment agent containing the phosphoric acids of 2% has little influence on the skin or the like even if the agent is used for the operation and contacts the skin or the like. On the other hand, it is conceivable that the treatment agent containing the phosphoric acids of 30 and 50% has serious influence on the skin of the human body or the like.

Examined Example 4

The treatment agent for the asbestos was prepared under the same condition of the examined example 1 using tap water (with electric conductivity of 10 mS/m) instead of the pure water and a slate specimen treated in the treatment agent like the examined example 1 was set as a comparison example 2. The qualitative analysis (JIS A 1481:2008) by X-ray diffraction (XRD) was performed on the comparison example 2.

As a result of the qualitative analysis, in the comparison example 2, brownmillerite in which there is a possibility of containing the chrysotile was detected so that a possibility of containing the chrysotile therein was seen.

Figure 4A:
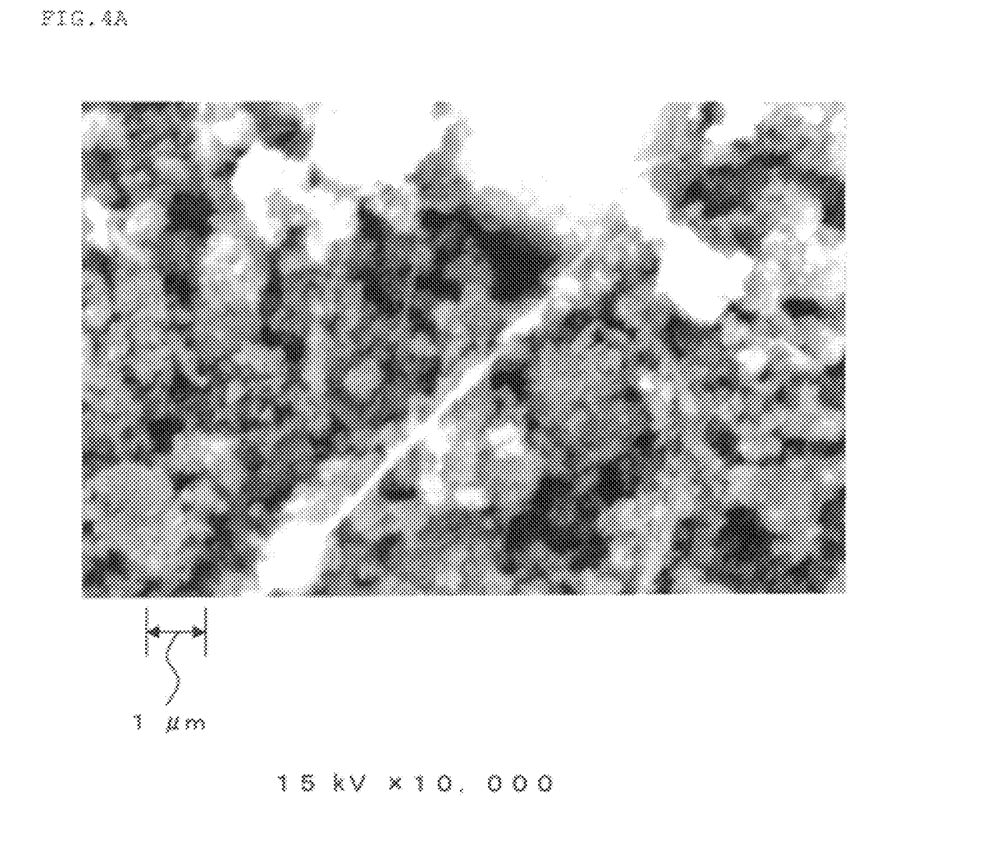
FIG. 4A is an electron microscope photograph of building materials of a comparison example 2 after the asbestos have been treated so as to be rendered harmless.
Figure 4B:
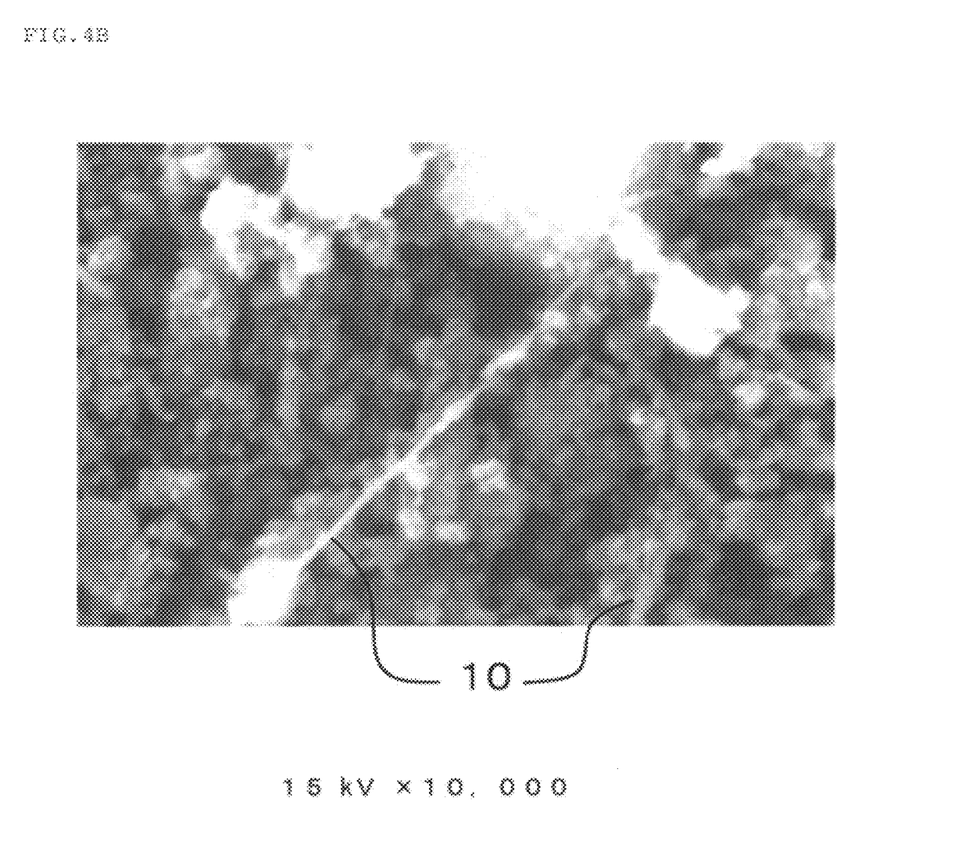
FIG. 4B is a diagram in which marks 10 are affixed to thin fiber like crystal materials, which are proper to the asbestos, shown in the photograph of FIG. 4A.

Further, morphological observation was performed on the comparison examples 2 by a scanning electron microscope (SEM). SEM photograph thereof of ten thousand magnifications is shown in FIG. 4A. As shown in FIG. 4B, there appear needle-like crystalline materials, which are indicated by FIG. 10, proper to the asbestos in the specimen of the comparison example 2.

As a result of the above-mentioned measurement, it is determined that there is a possibility of containing the chrysotile, which is a kind of the asbestos, in the comparison example 2. Accordingly, when preparing the treatment agent for asbestos using the tap water instead of the pure water, it is seen that a capacity of treating the asbestos is not suitably obtained.

Examined Example 5

The treatment agents for the asbestos were prepared under the same conditions of the examined examples 1 and 4 using the pure water and the tap water instead thereof and were stayed remained for about 20 days, an exterior view of which were observed. A result thereof is shown in FIGS. 5A and 5B.

Figure 5A:
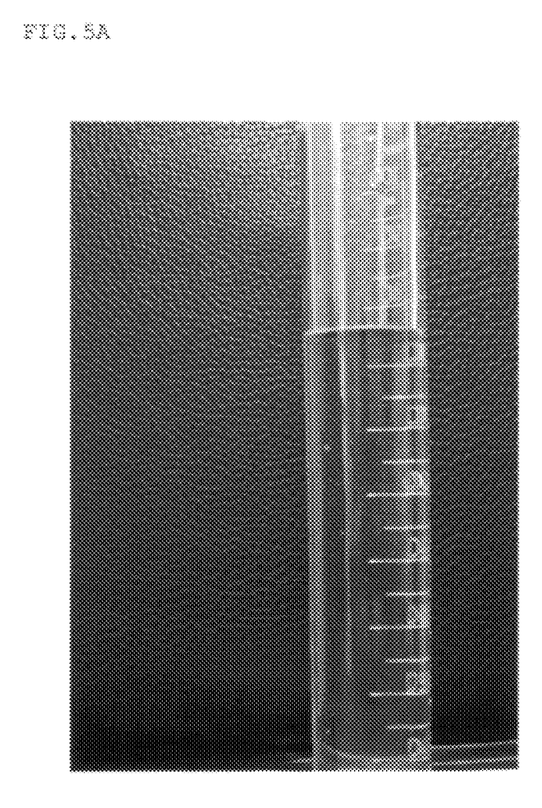
FIG. 5A is a photograph of the treatment agent for asbestos rested on after it has been unmixed and regulated to pure water.
Figure 5B:
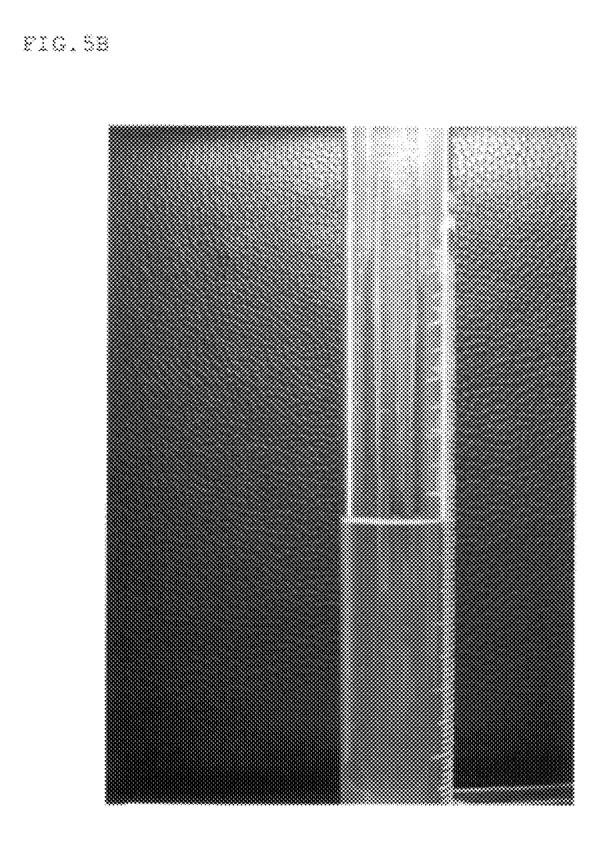
FIG. 5B is a photograph of the treatment agent for asbestos rested on after it has been regulated using tap water.

It is seen that no change occur in the treatment agent using the pure water shown in FIG. 5A but any cloudiness occurs in the treatment agent using the tap water shown in FIG. 5B, so that any change in a quality of which occurs. It is conceivable that any impurities such as calcium contained in the tap water react with the phosphoric acid, which is a cause of the cloudiness. It is also conceivable that this may have any influence on the treating capacity by the treatment agent for asbestos. By using the pure water, it is seen that the treatment agent for asbestos is kept with its quality staying unchanged, which enables long term storage thereof and/or the transportation thereof.

Examined Example 6

Hydrogen fluoride and gas generating any malodors or the like based on reaction between the treatment agent for asbestos and the slate were checked. The treatment agents for asbestos were prepared like the examined example 1 except that the concentrations of the phosphoric acid are respectively 2, 3, 5 and 10% by weight, into which the slate was inserted.

Gas around the treated treatment agents for asbestos was measured using a measuring instrument of a detector tube type (made by Gastek K.K., using a short-time detector tube, No. 17L for hydrogen fluoride, within a detection range of 0.09 through 72 ppm). As a result thereof, no generation of the hydrogen fluoride was detected in any concentrations of the phosphoric acid.

Although there appeared no change in the treatment agents having the concentrations of the phosphoric acid, 2 and 3% by weight, around the treated treatment agents for asbestos, but strong irritant malodors were confirmed in the treatment agents having the concentrations of the phosphoric acid, 5 and 10% by weight. It is supposed that these malodors are generated based on the reaction of components of the slate and the acid.

As a result of the above measurements, it is seen that in the treatment agent for asbestos according to the invention, no hydrogen fluoride occurs in the treatment in spite of the concentrations of phosphoric acid. It is also seen that in a case where the concentration of phosphoric acid is 3% by weight or less, any malodors do not occur, which does not interfere with the operation.

This invention is limited to the above-mentioned embodiments and it should be understood by those skilled in the art that various modifications, combinations, sub-combinations and alterations may occur depending on design requirements and other factors insofar as they are within the scope of the appended claims or the equivalents thereof.

INDUSTRIAL APPLICABILITY

The present invention is suitable for a treatment for asbestos and a recycle thereof and is widely suitable for a construction industrial as well as is widely suitable in any industries in which part using the asbestos is treated or recycled.

The invention claimed is:

1. A treatment agent for asbestos, the agent containing:
   phosphoric acid of 0.5 through 3.0% by weight;
   hydrogen peroxide of 1 through 20% by weight;
   alcohol of 0.5 through 20% by weight; and
   pure water.

2. The treatment agent for asbestos according to claim 1, wherein the pure water has electric conductivity of 2.0 mS/m or less.

3. The treatment agent for asbestos according to claim 1, wherein the phosphoric acid of 1.0 through 2.5% by weight is contained;
   the hydrogen peroxide of 2.0 through 6.0% by weight is contained; and
   the alcohol includes ethanol of 1.0 through 5.0% by weight.

4. A treatment method of asbestos comprising the steps of:
   permeating a treatment agent for asbestos into materials to be treated, which contain the asbestos, the agent containing:
   phosphoric acid of 0.5 through 3.0% by weight;
   hydrogen peroxide of 1 through 20% by weight;
   alcohol of 0.5 through 20% by weight; and
   pure water; and then
   washing the treatment agent for asbestos by washing water and removing it from the materials to be treated.

5. The treatment method of asbestos according to claim 4, wherein the pure water has electric conductivity of 2.0 mS/m or less.

6. The treatment method of asbestos according to claim 4, wherein the phosphoric acid of 1.0 through 2.5% by weight is contained;
   the hydrogen peroxide of 2.0 through 6.0% by weight is contained; and
   the alcohol includes ethanol of 1.0 through 5.0% by weight.

7. The treatment method of asbestos according to claim 4, wherein the washing water has pH of 7.0 or more.

8. The treatment method of asbestos according to claim 4, wherein the materials to be treated are building materials which contain the asbestos,
   permeating the treatment agent for asbestos into the building materials by spraying it to the building materials; and then
   washing the treatment agent for asbestos and removing it by spraying the washing water to the building materials.

9. The treatment method of asbestos according to claim 4, wherein the materials to be treated are building materials which contain the asbestos,
   permeating the treatment agent for asbestos into the building materials by inserting the building materials into the treatment agent for asbestos; and then
   washing the treatment agent for asbestos and removing it by inserting the building materials into the washing water.

* * * * *